United States Patent [19]

Fan

[11] Patent Number: 4,732,449
[45] Date of Patent: Mar. 22, 1988

[54] BEAM SPLITTER

[75] Inventor: Robert J. Fan, Reseda, Calif.

[73] Assignee: G & H Technology, Santa Monica, Calif.

[21] Appl. No.: 791,457

[22] Filed: Oct. 25, 1985

[51] Int. Cl.⁴ .............................................. G02B 6/32
[52] U.S. Cl. .............................. 350/96.18; 350/96.15; 350/96.20
[58] Field of Search ............... 350/96.15, 96.16, 96.18, 350/96.20, 96.21, 96.22

[56] References Cited

U.S. PATENT DOCUMENTS 4,213,677  7/1980  Sugimoto et al. ............... 350/96.18

Primary Examiner—William L. Sikes
Assistant Examiner—Robert E. Wise
Attorney, Agent, or Firm—George J. Netter

[57] ABSTRACT

A support structure for the beam splitter consists of three parts unitarily arranged. A central part has a relatively large V-groove extending along a surface between opposite edges and two identical end parts each have a pair of parallel smaller V-grooves arranged on a flat surface. Two lenses joined at a common face by a semi-reflective film of known transmission characteristics are located in the housing central part groove. Bare optical fibers are located in each of the end part grooves with the faced-off end of each fiber in non-pressurizing contact with the lens system circular end face after which the entire assembly is encapsulated.

6 Claims, 6 Drawing Figures

BEAM SPLITTER

The present invention relates generally to optical fiber wave guides, and, more particularly, to a device for receiving a light signal from a first optical fiber and transmitting a predetermined proportional intensity of the signal.

BACKGROUND

The use of the optical fibers for transmission of signals is of ever increasing importance and offers distinct advantages in many circumstances over conventional electrical and electronic techniques. In addition to transmitting light signals along optical fiber waveguides, from one location to another, it is frequently necessary or desirable to be able to split the beam into parts having predetermined proportions of the original signal intensity and a device having that capability will be referred to herein as a beam splitter. In the past this has only been accomplished by passing the light signal through a filter with the interrelation of optical fiber waveguides to the filter being via complicated apparatus.

OBJECTS AND SUMMARY OF THE INVENTION

It is therefore a primary object and aim of this invention to provide a beam splitter capable of receiving an optical signal from an optical fiber and transmitting a predetermined proportional part to a second fiber.

Another object of the present invention is the provision of a method of manufacturing the beam splitter of the above object which is simple, highly accurate and relatively inexpensive to practice.

A supporting structure or housing for the beam splitter consists of three parts joined together in final assembly into unitary relationship. A central housing part has a relatively large V-groove extending along a surface between opposite edges. Two end housing parts are identical and each have a pair of parallel smaller V-grooves arranged on a flat surface. The three parts are arranged in edge contacting relationship, the central part with an end part of each side, such that the three V-grooves extend in the same direction and the grooves in the two end parts are colinear to one another.

A cylindrical lens system consisting of two cylindrical lenses joined at a common face by a semireflective film or coating of known transmission characteristics, is located in the housing central part within the V-groove with its circular end faces facing toward the two end parts. The transmission characteristics of the semi-reflective film or coating are of predetermined character in order to transmit a desired ratio or percentage of an incoming signal (e.g., 70 percent), to one of the lens end surfaces. Bare optical fibers are located in each of the end part grooves with the faced-off end of each fiber in nonpressurizing contact with the lens system circular end face. Alternatively, the fiber may be slightly spaced from the lens system and an index matching liquid interposed.

The relative dimensions of the various housing parts and the location of the V-grooves are such that a portion of a signal entering along one fiber will be reflected at the semi-reflecting coating back onto the other fiber on the same side of the lens system with low signal loss. In addition, a further portion of the same incoming signal will be transmitted through the lens system to exit at a fiber on the opposite side of the lens system.

In the manner just described, an incoming signal is split into two parts of predetermined intensities depending upon the semi-reflective characteristics. For example, for a semi-reflecting film that transmits 70 percent of incident radiation, the result is a transmitted signal of 70 percent intensity of the incoming signal and a second (reflected) output signal which is 30 percent of the incoming signal. Although typically the described device will operate as a three port beam splitter, it is constructed as a four port device which enables optionally placing an incoming signal on either of two fibers at the input side.

With the beam splitter parts all in proper relation to one another, a quantity of an epoxy is then applied over the fibers and lens system, encapsulating and securing them together into correct operating relation.

As an alternate version, the semi-reflecting film may be dichroic which reflects certain frequency components of an incoming signal while transmitting the remaining frequencies. In this way there is not only an intensity proportioning obtained, but also a separation of frequency components onto different optical fibers.

DESCRIPTION OF A PREFERRED EMBODIMENT

Figure 1:
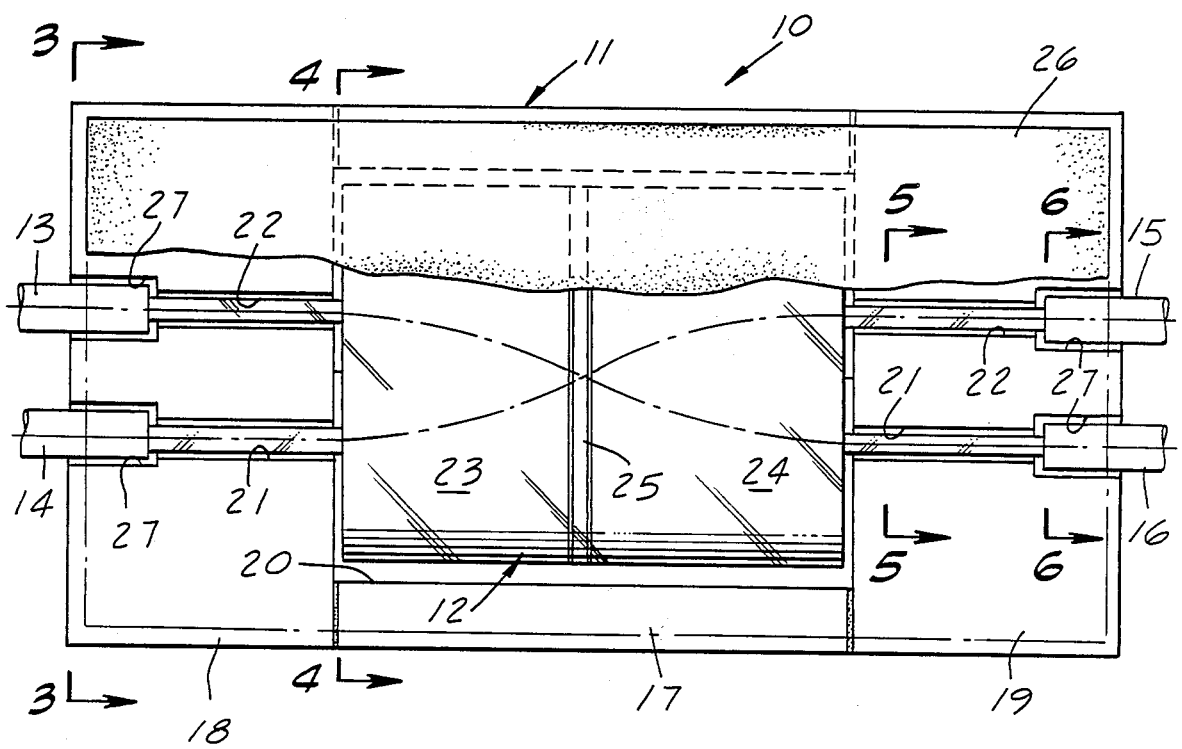
FIG. 1 is a top plan view of the beam splitter of this invention.
Figure 3:
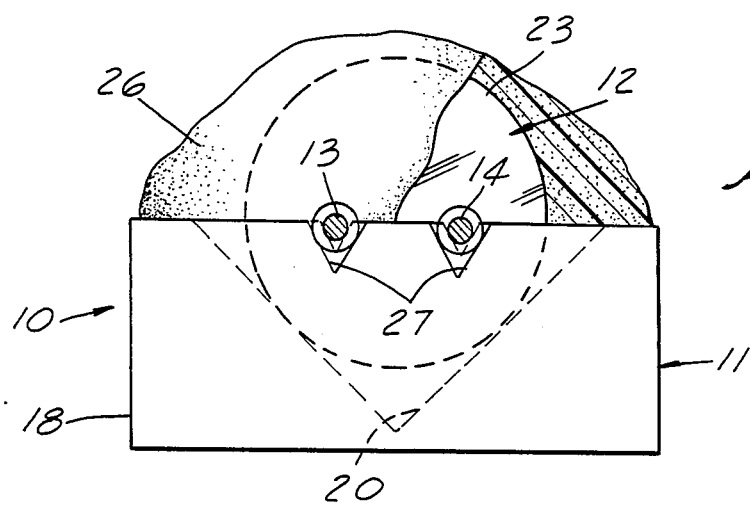
FIGS. 3-6 are end elevational, sectional views taken along the lines 3—3, 4—4, 5—5 and 6—6, respectively of FIG. 1.
Figure 4:
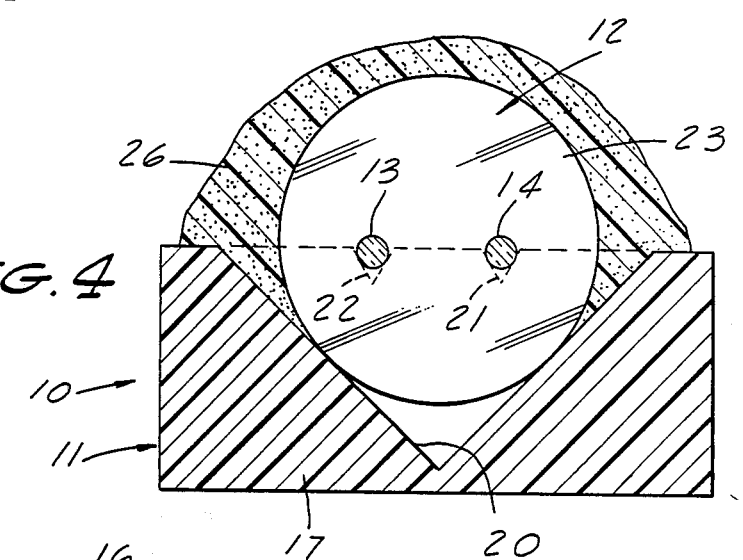
Figure 5:
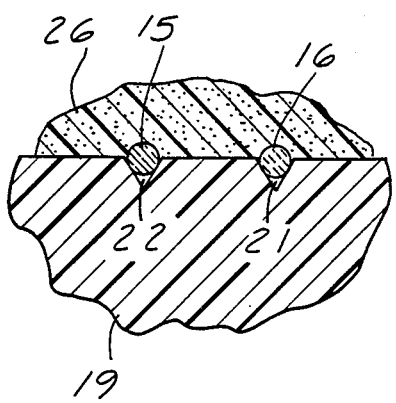
Figure 6:
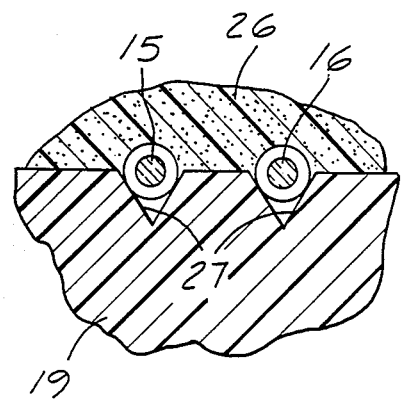

With reference now to the drawing and particularly FIG. 1, a device for splitting an optical signal into parts having intensities of a predetermined proportion of an incoming signal is enumerated generally as at 10. In its major parts, the device includes a support base 11, a lens system 12, and optical fibers 13, 14, 15 and 16 arranged in two pairs, one pair of fibers at opposite sides of the device.

Since precisely accurate location of the various parts to one another is a fundamental requirement for efficient operation of the described beam splitter, it is necessary in fabrication that the lens system and the two pairs of optical fibers be accurately located with respect to one another and that this precise relationship be maintained in the final device. This is accomplished by having the support base 11 serve initially as an aligning and positioning fixture during manufacture as well as being an integral part of the finished device.

Figure 2:
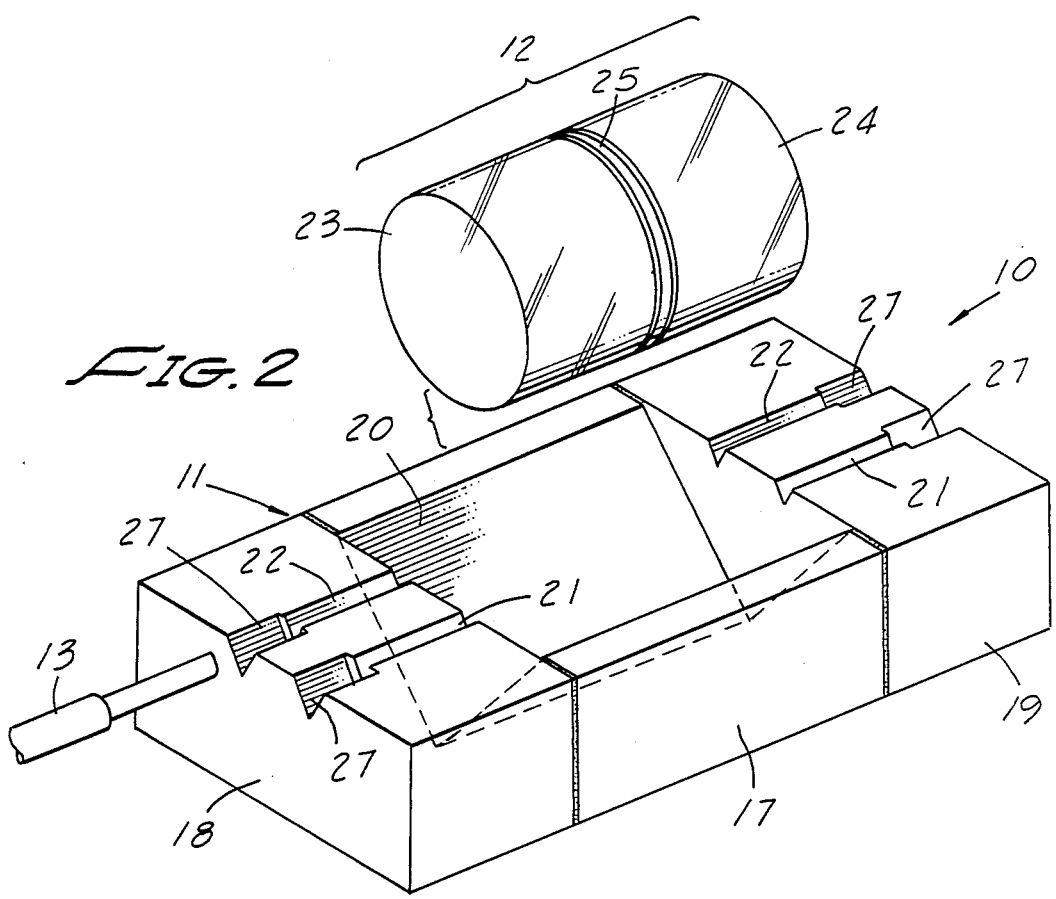
FIG. 2 is an exploded view of the supporting structure or housing parts of the beam splitter.

The support base 11 on which the various active parts of the beam splitter are arranged during fabrication of the device is shown in FIG. 2 and is seen to include a central part 17 with two identical end parts 18 and 19. The central part consists generally of a rectangular parallelepiped member constructed of any of a number of different polymers having a straight-line, V-shaped groove 20 in a flat surface thereof extending completely across the surface between two parallel opposite edges.

A housing end part is also of rectangular parallelepiped geometry and includes a pair of relatively small, parallel V-grooves 21 and 22 formed in a major surface of the part. Each of the end parts is brought into side surface contacting relationship with the central part 17 such that the parallel grooves in end part 18 are colinear with the grooves in end part 19 and lie along axes located inwardly of the V-groove 20 in the central part.

The three housing parts are assembled into a unitary relationship as in FIG. 1 by applying a suitable cementious material such as an epoxy to the part facing surfaces. In the finished support base, not only are the two pairs of V-grooves 21 and 22 colinear, but the grooves 21 and 22 are parallel, have a predetermined location relative to groove 20 as will be more particularly described, and are on the same side (upper) of the base.

The lens system 12 includes a pair of identical cylindrical lenses 23 and 24 each having end faces precisely faced-off at 90 degrees to the cylindrical axis. The two lenses are then joined at a common circular end face by a semi-reflective coating or film 25 of predetermined light transmission characteristics. The length of the lens system is such that when it is received within the groove 20 in the central base part 17, its end surfaces are located closely adjacent the opposite end walls of the parts 18, 19.

In assembly of the device, the lens system 12 is placed in V-groove 20 and the cladding and buffer material is removed from an end portion of each fiber 13–16. Next, the bare fibers are positioned in the V-grooves 21, 22 of the base end parts 18 and 19. Specifically, the ends of the fibers are located very closely spaced from the opposite circular end faces of the lenses and a quantity of liquid matching the fiber index of refraction is placed in contact with both the fiber ends and opposite lens end face. Finally, a suitable encapsulant 26 (e.g., epoxy) is applied over the fibers, lens system and base parts unitarily fixing the various beam splitter components into proper relationship.

The support base parts 17–19 can be optionally made of glass, metal or a synthetic plastic having sufficient rigidity and physical characteristics enabling forming of the precisely dimensioned V-grooves 21 and 22.

The dimensions of the grooves 20–22 and the arrangement of the support base parts 17–19 are such that the fiber ends all lie in a common plane which includes the optical axis (i.e., cylindrical axis) of the lens system 12. Preferably, the cylindrical lenses 23 and 24 forming the lens system are constructed of a material having a refractive index that varies according to the square of the distance from the optical axis. The lens system serves to locate the transmitted portion of the optical signal at the same distance from the optical axis on the opposite lens system end face as the point of entry on the input face. By this construction the beam splitter is symmetrically bidirectional in that if either fibers 13 or 16 is used as input for an optical signal the other fiber emits the transmitted component.

As already noted, it is an essential function of the film or coating 25 to transmit a predetermined proportion of an incoming optical signal and reflect the remainder. Accordingly, an income signal applied to fiber 13 has a predetermined proportion (e.g., 70 percent) transmitted through the lens system to exit via fiber 16, while the remainder (e.g., 30 percent) of the optical signal reflects off coating or film 25 to fiber 14. By varying the material from which this coating or fiber is made as well as its thickness, any desired ratio of light signal transmission to reflection can be achieved over an extended range.

Still further, where transmission variation of substantially the entire signal is desired this can be obtained by vacuum deposition of a metal film 25. It is also possible to achieve separation of selected frequencies by utilizing a so-called dichroic material for the film 25 which transmits certain frequencies while reflecting others. Dichroic materials of great variety are available for selectively transmitting (and reflecting) any desired frequency range of light components.

The described beam splitter device can be readily assembled under field conditions as well as being simple to manufacture in that the highly precise relative location of device components is achieved without the need for expensive and difficult to use fixtures or jigs. More particularly, the housing parts which accurately locate the various beam splitter parts during fabrication form a permanent housing for the completed device.

The grooves 21 and 22 have been described as having a V-shaped cross-section and of dimensions enabling receipt and proper location of a bare fiber. Although that construction is satisfactory, a far stronger device results when the outer end portion of each fiber receiving groove is enlarged as at 27 (FIGS. 1 and 2). In this manner the bare fibers are located in the narrower cross-section grooves 21 and 22 while the immediately adjacent cladding and protective coating of the fiber rests in the larger cross-section groove 27. The encapsulant 26 now can hold the fiber protective coating and the bare fibers along with the other device parts thereby preventing transverse working of the bare fiber which could result in fiber breakage.

I claim:

1. An optical signal beam splitter receiving an optical signal from a first fiber waveguide and passing signals to second and third fiber waveguides of predetermined character comprising:

a support base having a generally V-shaped in cross-section centrally located first groove in a surface thereof, second and third grooves in said surface communicating with said first groove and of smaller cross-section, and a fourth groove in said surface communication with said first groove and of smaller cross-section than said first groove;

first and second cylindrical lenses located in said first groove with their cylindrical axes colinear and parallel to the internal edge of said first groove;

a semi-reflecting film located between said first and second lenses;

said first, second and third fiber waveguides being received respectively within the second, third and fourth grooves with an outer end of each fiber waveguide being located slightly spaced from a surface of said first and second lenses;

a separate quantity of index matching liquid contacting the end of each fiber waveguide and a lens surface immediately opposite thereto; and an encapsulant unitarily relating the lenses, fiber waveguides and support base.

2. An optical signal beam splitter as in claim 1, in which the fiber waveguide longitudinal axes extend along the second, third and fourth grooves and lie in a common plane including the cylindrical axes of the first and second lenses.

3. An optical signal beam splitter as in claim 1, in which the semi-reflective film is made of a dichroic material.

4. An optical signal beam splitter as in claim 1, in which the support base consists of a central part having the first groove on a surface thereof extending completely thereacross, first and second parts affixed respectively to opposite sides of the central part, the first part having said second and third grooves and the second part including the fourth groove, and a cementitious material securing the first and second parts to the central part.

5. An optical signal beam splitter as in claim 4, in which the first, second and central parts are constructed of a material selected from the group consisting of glass, metal or synthetic plastic.

6. An optical signal beam splitter as in claim 4, in which the support base second part is identical to the first part.

* * * * *